(12) United States Patent
Chihoub et al.

(10) Patent No.: US 7,439,974 B2
(45) Date of Patent: Oct. 21, 2008

(54) SYSTEM AND METHOD FOR FAST 3-DIMENSIONAL DATA FUSION

(75) Inventors: Abdelaziz Chihoub, Lawrenceville, NJ (US); Yuanhsi (Tony) Chen, Mt. Laurel, NJ (US); Mariappan S. Nadar, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 290 days.

(21) Appl. No.: 11/348,131

(22) Filed: Feb. 6, 2006

(65) Prior Publication Data
US 2006/0256111 A1   Nov. 16, 2006

Related U.S. Application Data

(60) Provisional application No. 60/651,412, filed on Feb. 9, 2005.

(51) Int. Cl.
*G06T 15/40* (2006.01)

(52) U.S. Cl. ..................................... 345/422

(58) Field of Classification Search ............... 345/419, 345/422, 424, 426, 581, 423, 589, 601, 629
See application file for complete search history.

(56) References Cited

U.S. PATENT DOCUMENTS

2003/0234781 A1*  12/2003  Laidlaw et al. .............. 345/419

OTHER PUBLICATIONS

VolumePro 1000 Principles of Operation, Part No. 81-005, Dec. 2001.

* cited by examiner

*Primary Examiner*—Kimbinh T Nguyen
(74) *Attorney, Agent, or Firm*—Donald B. Paschburg; F. Chau & Associates, LLC

(57) ABSTRACT

A method of volume rendering two digital images includes providing a volume-rendering computing sub-system, loading a first image volume into a memory of the volume-rendering sub-system, rendering the first image volume, wherein a 2-dimensional image is output into an image buffer and a set of depth values are output into a depth buffer, loading a second image volume into a memory of the volume-rendering sub-system, rendering the second image volume up to the depth values output from the first image volume, wherein values from the rendering of the second image volume are merged with non-zero values of the image buffer, and rendering the remainder of the second image volume to include second image volume points beyond the depth values output from the rendering of the first image volume, wherein values from the rendering of the remainder of the second image volume are merged with non-zero values of the image buffer.

18 Claims, 3 Drawing Sheets

SYSTEM AND METHOD FOR FAST 3-DIMENSIONAL DATA FUSION

CROSS REFERENCE TO RELATED UNITED STATES APPLICATIONS

This application claims priority from "Fast 3D Fusion Method using the VolumePro 1000", U.S. Provisional Application No. 60/651,412 of Chihoub, et al., filed Feb. 9, 2005, the contents of which are incorporated herein by reference.

TECHNICAL FIELD

This invention is directed volume rendering of volumetric digital image data.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels. Computer-aided diagnosis ("CAD") systems play a critical role in the analysis and visualization of digital imaging data.

Visualization of an image can be accomplished by volume rendering the image, a set of techniques for projecting three-dimensional volumetric data onto a two-dimensional display image. The efficient visualization of volumetric datasets is important for many applications, including medical imaging, finite element analysis, mechanical simulations, etc. The 3-dimensional datasets obtained from scanning modalities such as computed tomography (CT), magnetic resonance imaging (MRI), positron emission tomography (PET), ultrasound (US), etc., are usually quite complex, and contain many different objects and structures. For example, intensity-based tissue classification and anatomical regions of interest can be defined with MRI, while metabolic activity from the same region can be measured with PET. These datasets can be further computed to merge into a single volume thus combining the information of all modalities, a process known as fusion. The available computing power and sophisticated display software allow for the fused images to be captured on screen with both scientific authenticity and esthetic worth.

Fusing multiple data sets is an important feature in visualizing and interpreting data in many applications. These applications include image-guided surgery, image-guided radiotherapy, non-invasive diagnosis, and treatment planning. In particular, in the medical field fusing data from different modalities is not only useful but is a crucial feature in many scenarios, such as surgery planning as well as in diagnosing certain types of abnormalities.

Advances in processor technology have made it possible to perform the computationally intensive task of fusing 3D data sets interactively. This has made their use in real world applications very attractive, and has also encouraged further research in efficient and novel ways to perform data fusion. Thus, these recent advances in image acquisition, image fusion, and 3D-image display have radically changed the ability to visualize the inner workings of the human body.

SUMMARY OF THE INVENTION

Exemplary embodiments of the invention as described herein generally include methods and systems for the fusing of 3D data using the TeraRecon VolumePro® 1000 volume rendering hardware board. According to an embodiment of the invention, a volume rendering method uses the classifier/combiner feature of the VolumePro® 1000 to fuse multiple data sets at the voxel level. According to a further embodiment of the invention, a volume rendering method uses the depth buffer features of the VolumePro® 1000 to fuse multiple data sets at the pixel level. Embodiments of the invention have been prototyped and tested with several medical data sets. Embodiments of the invention can be implemented as plugins that can be integrated into existing workflows. Further embodiments of the invention can handle additional data sets.

According to an aspect of the invention, there is provided a method of volume rendering two digital image datasets including providing at least a first digitized image volume and a second digitized image volume, each image volume comprising a plurality of intensities corresponding to a domain of points on a 3-dimensional grid, providing a volume-rendering computing sub-system, said sub-system adapted to function as part of a personal computer workstation, said system comprising memory for storing said 3-dimensional image volumes, an image buffer for storing 2-dimensional renderings of said 3-dimensional images, and a depth buffer for storing depth values for said 2-dimensional renderings, loading a first image volume into a memory of said volume-rendering sub-system, rendering said first image volume, wherein a 2-dimensional image is output into an image buffer and a set of depth values are output into a depth buffer, loading a second image volume into a memory of said volume-rendering sub-system, rendering said second image volume up to the depth values output from the rendering of said first image volume, wherein values from said rendering of said second image volume are merged with non-zero values of said image buffer, and rendering the remainder of said second image volume to include second image volume points beyond the depth values output from the rendering of said first image volume, wherein values from said rendering of said remainder of said second image volume are merged with non-zero values of said image buffer.

According to a further aspect of the invention, the method further comprises displaying the result of said rendering on a computer display monitor.

According to a further aspect of the invention, rendering an image volume comprises casting a plurality of rays from an image plane into said image volume, selecting sample points from said image volume along each said ray, assigning color and opacity values to each sample point along each ray, and accumulating color and opacity values from each successive sample point along each ray.

According to a further aspect of the invention, the volume-rendering computing sub-system includes look-up-tables (LUT) for classifying image intensity values, and further comprising initializing a first LUT associated with said first image volume, initializing a second LUT associated with said second image volume, wherein said LUT assigns a color or opacity value to a sample based on the image volume intensity value associated with said sample.

According to a further aspect of the invention, the volume-rendering computing sub-system includes functions for testing and updating depth values, and further comprising selecting functions for testing and updating depth values of said first image volume, and selecting functions for testing and updating depth values of said second image volume.

According to a further aspect of the invention, the volume-rendering computing sub-system includes functions for filtering and accumulating image intensity values, and further comprising selecting functions for accumulating said first image volume intensity values and for accumulating said second image volume intensity values.

According to a further aspect of the invention, the functions for testing and updating depth values include one or more of testing the direction of a gradient of said image volume intensity, testing whether or not the magnitude of said gradient lies within a certain range, testing whether or not a value of a sample lies within a predetermined range, and testing whether or not an accumulated value of a ray lies within a predetermined range.

According to a further aspect of the invention, the functions for accumulating said image volume intensity values include Front-to-Back, Back-to-Front, Minimum, Maximum, Replace, and Sum-and-Count.

According to a further aspect of the invention, the method is implemented in a program of instructions executable by a computer, said program of instructions tangibly embodied in a program storage device readable by a computer.

According to another aspect of the invention, there is provided a method of volume rendering two digital image datasets including providing at least a first digitized image volume and a second digitized image volume, each image volume comprising a plurality of intensities corresponding to a domain of points on a 3-dimensional grid, providing a volume-rendering computing sub-system, said sub-system adapted to function as part of a personal computer workstation, said system comprising memory for storing said 3-dimensional image volumes, and functions for filtering image volume intensity values and functions for blending image volume intensity values, reading said first and second image volumes into the memory of said volume-rendering computing sub-system, filtering said first image volume with a filtering function, filtering said second image volume with a filtering function, merging said first and second image volumes using a blending function, and rendering said merged image volume.

According to a further aspect of the invention, the method further comprises providing a fusion factor to said volume-rendering computing sub-system.

According to a further aspect of the invention, the method further comprises selecting one of said two image volumes as a low resolution dataset, and selecting the other of said two image volumes as a high resolution dataset.

According to a further aspect of the invention, the method further comprises converting said high resolution dataset and said low resolution dataset wherein more bits are used to represent the higher resolution data set than are used to represent the lower resolution data set.

According to a further aspect of the invention, the high resolution dataset is represented by 12-bit words, and said low resolution dataset is represented by 8-bit words.

According to a further aspect of the invention, the volume-rendering computing sub-system includes look-up-tables (LUT) for classifying image intensity values, and further comprising using said fusion factor to use an 8-bit LUT with said low resolution dataset and to use a 12-bit LUT with said high resolution dataset.

According to a further aspect of the invention, the filtering functions include functions for testing that an opacity of a sample is within a predetermined range, testing that an accumulated opacity is within a predetermined range, testing whether a gradient magnitude is within a predetermined range, and testing whether a gradient direction is within a predetermined direction.

According to a further aspect of the invention, each of said intensities comprises a vector of red, green, blue, and opacity values.

According to another aspect of the invention, there is provided a method of volume rendering a plurality of digital image datasets including providing a plurality of digitized image volumes, each image volume comprising a plurality of intensities corresponding to a domain of points on a 3-dimensional grid, providing a volume-rendering computing sub-system, dividing each of said plurality of image volumes into a plurality of slabs, each slab defined by a range of depths within each said image volume, for each of said plurality of image volumes, loading said images volumes into memory of said volume-rendering computing sub-system, rendering said first slab of each image volume using said volume-rendering computing sub-system, and merging the rendering of each first image volume slab into a first 2-dimensional image, rendering each subsequent slab of each image volume using said volume-rendering computing sub-system, merging the rendering of each subsequent slab into a subsequent 2-dimensional image, and merging each subsequent 2-dimensional image with said first 2-dimensional image.

DETAILED DESCRIPTION OF THE PREFERRED EMBODIMENTS

Figure 1:
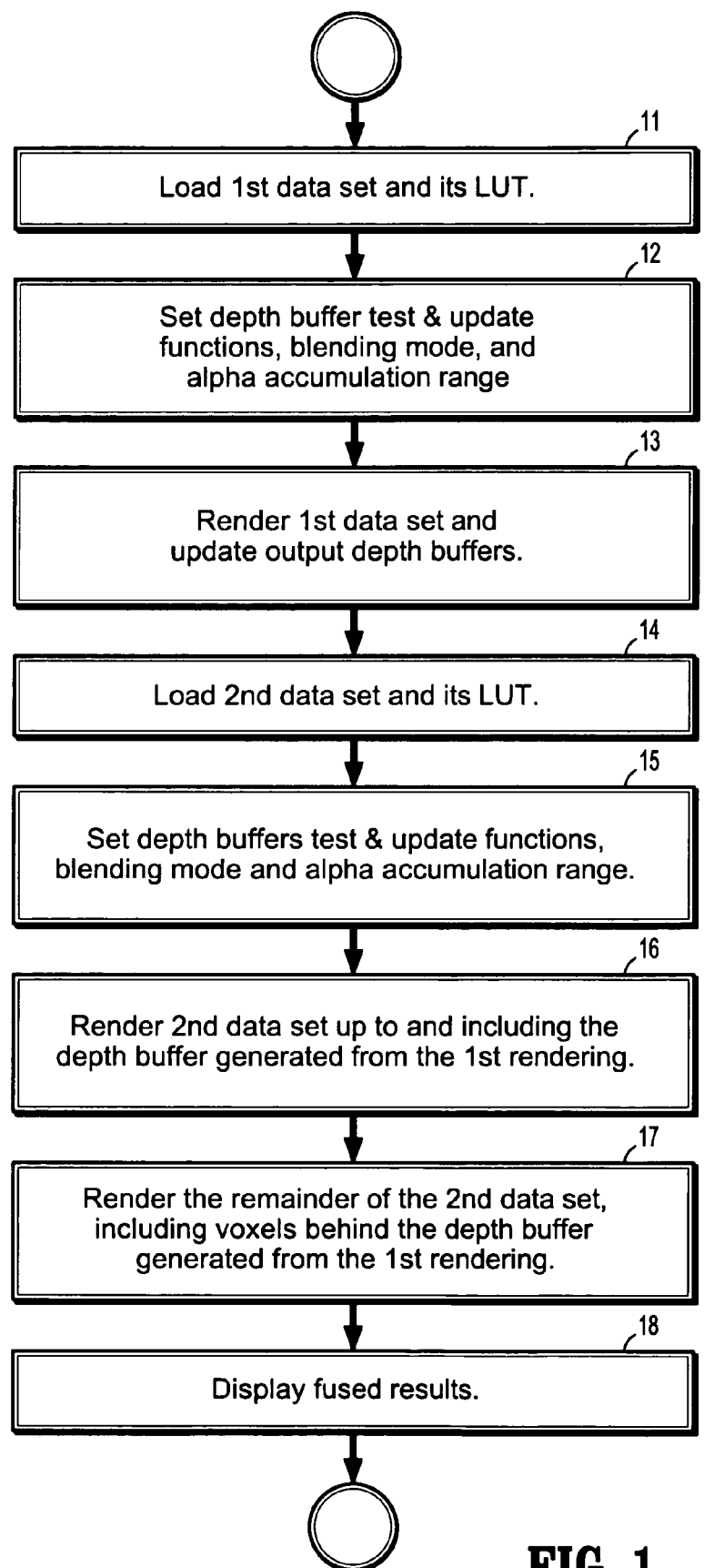
FIG. 1 is a flow chart of a depth buffer based data fusion method, according to an embodiment of the invention.

Exemplary embodiments of the invention as described herein generally include systems and methods for efficient data fusion using the TeraRecon VolumePro® 1000 volume rendering hardware board. However, specific structural and functional details disclosed herein are merely representative for purposes of describing example embodiments of the present invention. Further embodiments of the invention may, however, be embodied in many alternate forms and should not be construed as limited to the embodiments set forth herein. In particular, the embodiments of the invention disclosed herein are not limited to using the TeraRecon VolumePro® 1000 PCI board, but are applicable to any PCI board with similar architectural features that can support a method according to an embodiment of the invention.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Volume rendering is the process of converting volumetric data, or data generated by three dimensional (3D) scanning techniques, into a two dimensional image that can be displayed on a computer screen without immediate processing to extract and discover surfaces. 3D scanning techniques that generate volumetric data include magnetic resonance imaging (MRI), computed tomography (CT), and 3D ultrasound. Volume rendering can fully reveal the internal structure of 3D data, including amorphous and semi-transparent features.

The TeraRecon VolumePro® 1000 is a PCI board that performs volume rendering by casting rays through a three-dimensional volume from an image plane. A volume is represented as a three-dimensional array of voxels. The image plane is represented as a two-dimensional array of values. The values in the image plane store the output of the volume rendering. The data from the image plane can then be presented on a computer display screen. The VolumePro® 1000 also supports multi-board implementations that permit load sharing among multiple boards, for processing multiple volumes or volumes that are too large to be processed on a single board.

The VolumePro 1000 supports a flexible system of voxel formats. Voxels can be 8-, 16-, or 32-bits in size, and can have up to 4 fields. Each field can be independently converted to color and opacity values, and the interpretation and use of the fields can be determined by an application. The size, position, and format of each voxel field is specified at run-time. Each field must be a multiple of four bits (up to 16) and must be aligned at a four-bit boundary. Voxel fields have a format, which describes how the bits should be interpreted: unsigned binary integers, unsigned fractions in the range [0.0 . . . 1.0], inclusive, or signed fractions in the range [−1.0 . . . 1.0]. At the start of the VolumePro 1000 ray casting pipeline, each voxel field is converted to 12 bits in a process controlled by the format. In order to process two or more data sets that have been collected at different times or using different methods, the data should be aligned before it can be combined. In this case, the application will combine the data into a single volume with multiple voxel fields.

Each ray cast through the volume is an imaginary beam of light passing through the center of a pixel on the image plane. As the ray passes through the volume, it samples color (red, green, and blue) and opacity (a value indicating the opposite of transparency of the point) at sample points along the ray. These sample values are referred to as alpha values. The VolumePro 1000 then accumulates color and opacity values for each ray passing through the volume and stores the accumulated value, referred to as an accumulated alpha value, in a pixel on the image plane. The image can now be projected onto the computer display screen. If the opacity is 0, the point is completely transparent. If the opacity is 1, the point is completely opaque.

Processes required to render the 3D volumes into a 2D image that can be displayed on a computer screen include: (1) Casting the rays through the volume and defining sample points along the rays; (2) Assigning color and opacity values to the sample points (classification); (3) Interpolating voxel or color values to new sample points along each ray (interpolation); (4) Calculating gradients and assigning lighting to the image (illumination); and (5) Accumulating all the color and opacity values to create the image (compositing).

The VolumePro 1000 supports volume rendering by performing basic operations on data at voxel or sample points, including, but not limited to, classification, interpolation, compositing, depth updating, and filtering. The VolumePro 1000 can currently support up to 1 Gbyte of 64-bit random-access memory, enough to store a data set of up to 8K voxels in any dimension. In addition, the VolumePro 1000 maintains two image buffers and two depth buffers. The image buffer contains the color values and opacity for each ray, while the depth buffer contains depth values for each pixel.

Classification is a process of assigning a color and opacity (red, green, blue, and alpha, also called RGBA) value to a raw or interpolated voxel in order to bring out certain features of the data set or make them completely transparent. This assignment is a function of the properties of a voxel field, such as its intensity, density, or label. This function is known as the transfer function. There is one transfer function for each field of the voxel. Transfer functions are designed by each application developer for a particular application and take into account such things as the type of scanner being used to collect the data set and the application being developed. For example, a set of transfer functions used to look for irregularities in heart valves would be very different from those used to study brain tissue or to search for oil in the earth. There are three parts to the classification function of the VolumePro 1000: (1) the transfer functions themselves (one for each voxel field); (2) the arithmetic and logical combinations of the results of the transfer functions into a final color and opacity value; and (3) the weighting of color values by the opacity.

A transfer function can be represented by a lookup table. That is, for each possible field value, there is one entry in the lookup table specifying the red, green, blue, and alpha (opacity) values assigned to that field value. The VolumePro 1000 has four lookup tables, one for each of the four possible voxel fields. One lookup table has 4096 entries and the other three lookup tables have 256 entries each. If a voxel field has more bits than indicated by the size of its lookup table, the low-order bits are dropped. If a voxel field has fewer bits than indicated by the size of its lookup table, some of the entries of the table are unused.

A convenient way to think about a transfer function is as a histogram. The ordinate represents the possible values for a voxel field, while the abscissa represents the frequency of each data value in the volume data set. Each color value and opacity value is expressed as a fraction between zero and one, inclusive.

For the 256-entry tables, the 12-bit voxel field will be converted to 8 bits (according to the format) and then used as an index into the table. For the 4096-entry table, the 12-bit voxel field will be used directly as an index into the table. Each entry of the lookup tables is 36 bits wide.

A lookup table may be bypassed, and the voxel field data used instead. When a table is bypassed, the field values may be mapped directly to one or more output color opacity components.

Four channels (named red, green, blue, and alpha) are extracted from the lookup table entry or from the voxel field itself (if the lookup table is bypassed). All four channels from all four lookup tables are combined by a hierarchy of arithmetic-logical units (ALUs). The way in which the results are combined is a two-step approach. In the first step, the outputs of lookup tables 0 and 1 are combined, and the outputs of lookup tables 2 and 3 are combined, and these outputs can be further combined. The input to each ALU is four 12-bit channels, and each channel is processed independently. The output from the ALUs is four 12-bit channels representing the combined RGBA values.

In the second step, once the RGBA values have been combined the classifier performs opacity weighting. Opacity weighting simply means multiplying each color component (red, green, and blue) by the opacity. By this means, highly intense colors are suppressed if they are nearly transparent (their opacity is low).

Interpolation calculates new data values and gradients (re-sampled field or RGBA data) at sample points along rays based on the values or colors (RGBA) of the voxels closest to the sample points. The VolumePro 1000 can interpolate to a resolution of $1/256$ of one unit of voxel spacing in any direction. Performance is inversely proportional to the number of samples processed. More samples means more processing which may result in slower rendering rate.

Compositing is a process of combining the RGBA values of all the sample points along a ray cast through a volume into a single RGBA value in a pixel on the image plane. The VolumePro 1000 includes alpha correction, accumulation (blending), and early ray termination in its compositing process.

Prior to blending, the final value of the opacity for each sample may need to be corrected for the spacing of samples along rays. Alpha correction is used when the spacing of the sample points is different from the spacing for which alpha was originally defined (or that was defined in the lookup tables). An exemplary, non-limiting alpha correction formula is $\alpha_{corrected} = 1 - (1 - \alpha_{sample})^m$, where m is related to the ratio of sample spacing to voxel spacing.

For example, if sampling was originally performed once with a spacing between sample points of 1, then the volume was resampled with a spacing between sample points of 1/2 (generating twice as many samples), then alpha values must be reduced to avoid the volume appearing to "thick" or opaque.

The sample space determines how much opacity the area around a sample contributes to the overall opacity. When samples are farther apart, they contribute more opacity per sample and the alpha value needs to be larger at each sample.

Illuminated RGBA values at sample points are accumulated into a pixel array in memory. This pixel array, known as the image buffer, into which the values are accumulated is an array of up to 48-bit pixel values (four 12-bit channels, one each for red, green, blue, and alpha). The array contains one element for each ray cast from the image plane. As an illuminated RBGA value for a sample point of a particular ray enters the compositing module, that RGBA value is combined or blended with the pixel value previously stored in the pixel array for that same ray. The result of the combination of the sample points is stored back into the same position in the pixel array. This cycle is repeated for each sample point of each ray until all of the sample points have been composited.

The blending functions used by the VolumePro are formulas that are well known in 3D graphics. The VolumePro 1000 provides several different blending functions: Front-to-Back, Back-to-Front, Minimum, Maximum, Replace, and Sum-and-Count.

Another feature of the VolumePro 1000 is early ray termination. Early ray termination causes the VolumePro 1000 to stop accumulating sample points along a ray when an accumulated alpha value on a ray reaches a specified threshold. All remaining sample points on the ray are skipped. Once the threshold has been reached, no more processing of any kind is performed on the ray. It should be noted, however, that although filters provide a similar function, early ray termination stops all processing of all sample points along the ray as soon as the threshold is reached. However, when filters are used, some processing may still take place one each sample point even if the threshold has already been reached.

The VolumePro 1000 can keep track of depth values of each point in the depth buffers. Depth refers to the distance from the image plane to a point in the volume as measured along each ray. Depth values are a measure of depth in the range of $0.0 \ldots 1.0$. A depth buffer is a two dimensional array of depth values, with one value for each ray being cast from the image plane.

Another feature of the VolumePro 1000 is the ability to update either or both depth buffers during rendering. Depth updating may be made dependent upon a combination of one or more conditions, including: (1) the direction of the gradient (whether the gradient is front-facing or back-facing); (2) whether or not the magnitude of the gradient lies within a certain range; (3) whether or not the alpha value of the sample lies within a certain range; and (4) whether or not the accumulated alpha value of this ray lies within a certain range. If the combination of conditions is satisfied for a particular sample on a particular ray, then the depth value of that sample is stored into the corresponding element of the depth array.

The depth buffer can be used to determine whether a given pixel on the surface of an object is in front of or behind the corresponding pixel recorded in the frame buffer. (The term frame buffer is used for the combination of image (color) buffer and depth buffer.) If the given pixel is behind the pixel in the frame buffer, indicated by a depth value farther from the eye than the associated depth value in the depth buffer, the pixel is discarded. If however, the given pixel is nearer the viewer than the one in the frame buffer, then it replaces (or is blended with) the one in the frame buffer. The depth value replaces the corresponding depth value in the depth buffer. This depth testing technique allows the application to render objects in any order, with visibility determined pixel-by-pixel. This hidden-surface technique only works correctly for randomly ordered objects when the objects are opaque. When translucent surfaces obscure each other, an application must draw the surfaces in back-to-front order for so that a pixel on the surface at the rear of the scene is partially, but not completely, obscured by a pixel on a surface in front.

The VolumePro 1000 provides depth and image filtering to help applications select the visible samples to display. Filters can also reduce the processing load and therefore improve system performance. Before compositing, each sample point is tested against the filters that are specified. Sample points that do not satisfy the filtering criteria are treated as invisible and discarded. The VolumePro 1000 provides four types of filtering functions to determine whether sample points should be included or excluded: (1) Opacity of a sample in a range; (2) Accumulated opacity in a range; (3) Gradient magnitude in a range; and (4) Gradient direction (towards the camera or away from the camera).

Early ray termination provides a similar function to the Accumulated opacity in a range filter, except that early ray termination immediately stops all processing on a ray as soon as the opacity threshold is reached. With filtering, samples are still processed, even if they will be discarded because the opacity threshold has been reached.

The first three of the above filters provide filtering based on data values, while the fourth filter, the Gradient direction filter, provides filtering based on whether the gradient for the sample is front-facing or back-facing. The different filters can be used in different situations to obtain different results. Multiple filters can be used concurrently.

Suppose, for example, an application was not interested in samples that were completely or nearly translucent (e.g. samples with an opacity <=0.1). The sample alpha range filter can be used to specify that only samples with an opacity value >0.1 should be composited. All other samples would be discarded.

Alternatively, an application may wish to bring out all surfaces on an engine block. Higher gradient magnitudes indicate surfaces, so the application could filter out all samples with a gradient magnitude below a certain threshold. In this case, all samples with low gradient magnitude (indicating they do not represent surfaces) would be discarded.

Filtering using one of these methods is independent of updating depth values. A sample might pass a depth update test, causing one of the depth buffers to be updated with the depth value associated with the sample, but it still might be excluded from compositing if it failed one of the filter tests.

A flow chart of an exemplary depth buffer based data fusion method, according to an embodiment of the invention, is depicted in FIG. 1. In this embodiment, two data sets are loaded and are rendered separately as two 12-bit data sets, and the rendering process is performed iteratively. Note, however, that the description in terms of two data sets is for illustrative purposes only. It will be apparent to one skilled in the art how to render and fuse more than two data sets according to an embodiment of the invention. Furthermore, the bit size of the data words for the two sets was chosen for the current version of the VolumePro 1000, and other word sizes can be used by other embodiments of the invention implemented on other hardware boards.

Referring now to the figure, a first data set and an associated look-up-table (LUT) are loaded at step 11 into the main memory of the VolumePro 1000. At step 12, the conditions for testing and updating the depth buffer for the first data set are specified, along with the blending functions to be used, and the alpha accumulation range parameters. At step 13, a rendering operation is performed on the first data set. The depth buffer is updated, and the output is written into an image buffer. At step 14, a second data set and an associated look-up-table (LUT) are loaded into the main memory of the VolumePro 1000, and at step 15, the conditions for testing and updating the depth buffer for the second data set are specified, along with the blending functions to be used, and the alpha accumulation range parameters.

This second data set will be rendered using the output depth buffer and the output image buffer from the previous rendering step. According to an embodiment of the invention, the non-zero pixels from the first rendering will be merged at the depth levels specified by the output depth buffer with the blending of voxels from rendering the second data set. According to an embodiment of the invention, the second rendering step is implemented in two stages. In the first stage, at step 16, the second data set is rendered up to and including the plane defined by the depth buffer generated by the rendering of the first data set. The results from the rendering are merged as stated above with the results of the rendering of the first data set in the image buffer. In the second stage, at step 17, the remainder of the voxels in the $2^{nd}$ data set, those that are behind the plane of the depth buffer generated by rendering the first data set, are rendered and merged with the results of the previous rendering in the image buffer. The resulting 2D dataset in the image buffer is a fused image that can be displayed at step 18.

The method according to an embodiment of the invention presented in FIG. 1 can be modified to render and fuse the datasets on a slab-by slab basis. In the slab based merging method, each of the images to be merged by fusing is divided into sub-parts, referred to as slabs, defined by a range of depths specified by the depth buffer. Then, for each slab, a slab of the first volume is rendered, a slab of the second volume is rendered, the two rendering results are merged into a 2D image, and that 2D image is merged with the 2D image generated by the fusing of the previous set of slabs, until all slabs of each volume to be fused have rendered and merged. There is no limit on the number of slabs into which the image volumes are divided, however, using more slabs provides a better quality final image, but at the cost of a longer computation time. Note also that there is no limitation to the number of volumes that can be combined.

Figure 2:
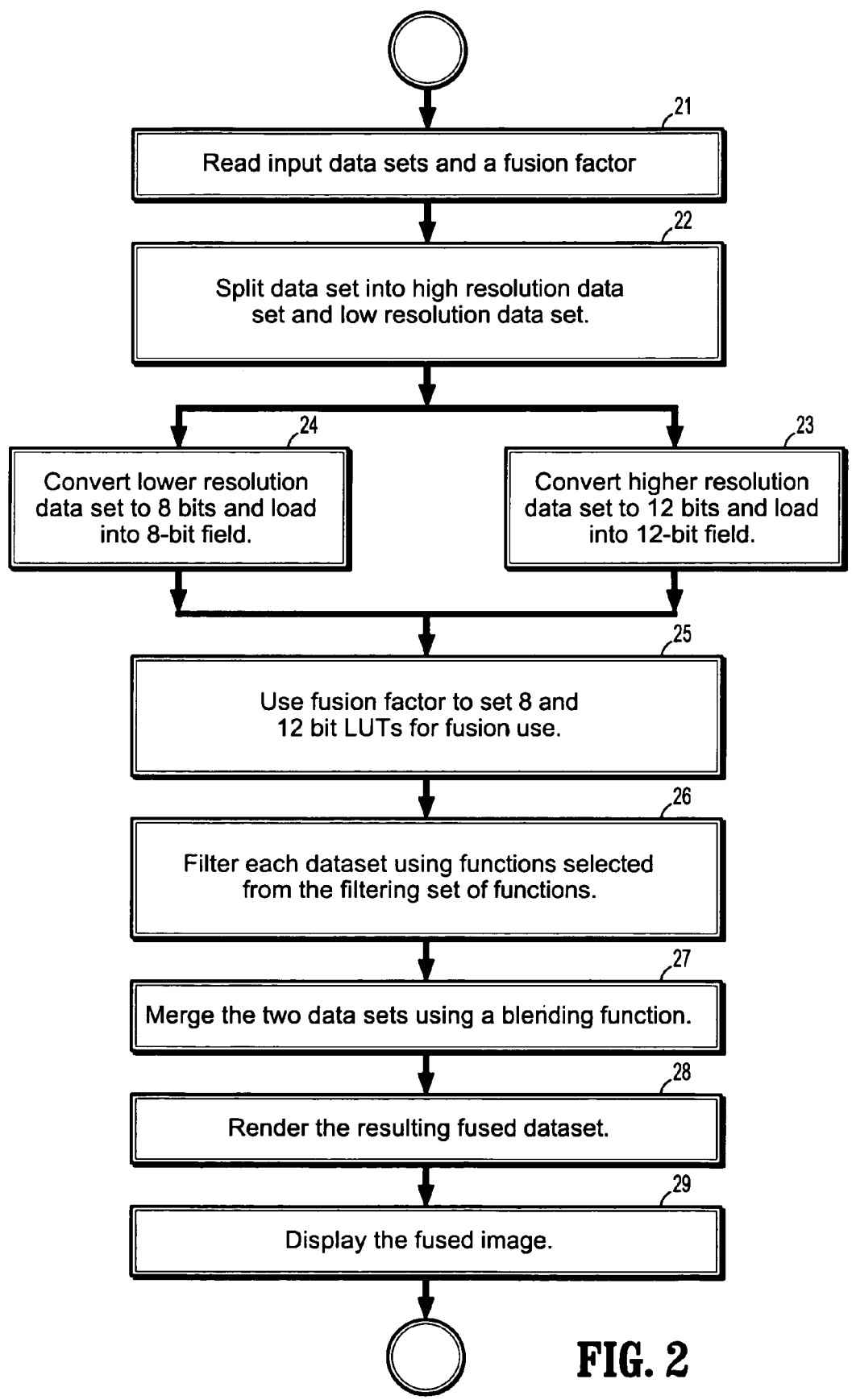
FIG. 2 is a flow chart of a voxel based data fusion method, according to an embodiment of the invention.

A flow chart of an exemplary voxel based data fusion method, according to an embodiment of the invention, is depicted in FIG. 2. In this embodiment, two data sets are loaded into two separate data fields in one volume array in the VolumePro 1000 memory. Once the data sets and their associated LUTs are loaded onto the board, the classifier functional unit of the VolumePro 1000 is used to define and use the functions needed to fuse the voxels from the two data sets.

Referring now to the figure, the data sets are loaded at step 21 so that one of the data sets is stored in the lower order fields of the volume array, while the other data set is loaded into the higher order fields. In addition, a fusion factor specified by the user is loaded that is used to set the LUTs associated with the two data sets for fusion use. Typicall, this fusion factor is a number between 0 and 1. At step 22, one of the data sets is selected to be a higher resolution data set, and the other dataset is selected as a lower resolution data set, where more bits are used to represent the higher resolution data set than are used to represent the lower resolution data set. According to an embodiment of the invention, the higher resolution dataset is converted at step 23 to a 12-bit representation and is loaded into a 12-bit field, while the lower resolution data set is converted at step 24 to an 8-bit representation and is loaded into a 8-bit field. Note, however, that these representations are exemplary and are based on current VolumePro 1000 hardware constraints, and other hardware implementations of an embodiment of the invention can use differing bit representations of the two data sets. The fusion factor is used at step 25 to set 8- and 12-bit LUTs for fusing. For example, representing the fusion factor by $\beta$, the values of the LUTs for the first image volume would be multiplied by $\beta$, while the values of the LUTs for the second image volume would be multiplied by $(1-\beta)$.

According to an embodiment of the invention, a two level hardware based process is used to merge the datasets. At step 26, each of the data sets is filtered using selected functions from the filtering set of functions. Then, at step 27, the two filtered data sets are merged according to the fusion factor. For example, using the red channel for illustrative purposes, the fused red value would be equal to $R_1\%\beta+R_2\%(1-\beta)$, where $R_1$ is the output of a red color lookup in the red LUT for the first image volume, and $R_2$ is the output of a red color lookup in the red LUT for the second image volume. Each of the R, G, B, and A channels will be fused in the same manner. The result is a single volume that is rendered at step 28 by the VolumePro 1000 rendering pipeline, which can then be displayed at step 29 on the display screen of a computer monitor.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
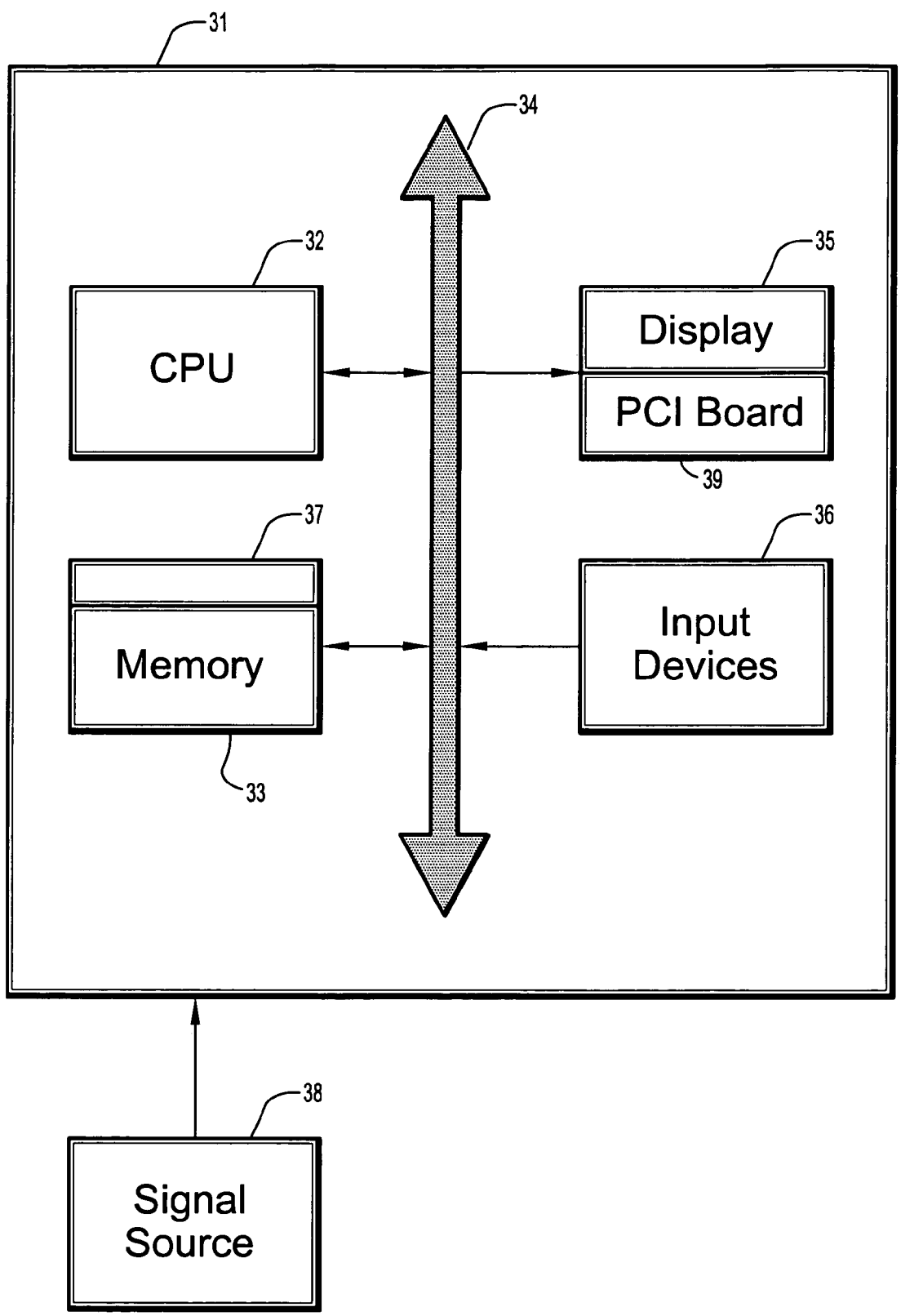
FIG. 3 is a block diagram of an exemplary computer system for implementing a data fusion method according to an embodiment of the invention.

FIG. 3 is a block diagram of an exemplary computer system for implementing a 3D data fusion method according to an embodiment of the invention. Referring now to FIG. 3, a computer system 31 for implementing the present invention can comprise, inter alia, a central processing unit (CPU) 32, a memory 33, an input/output (I/O) interface 34, and a PCI board adapted to perform volume rendering, such as the VolumePro 1000. The computer system 31 is generally coupled through the I/O interface 34 to a display 35 and various input devices 36 such as a mouse and a keyboard. The support circuits can include circuits such as cache, power supplies, clock circuits, and a communication bus. The memory 33 can include random access memory (RAM), read only memory (ROM), disk drive, tape drive, etc., or a combinations thereof. The present invention can be implemented as a routine 37 that is stored in memory 33 and executed either by the CPU 32 and/or by a controlling circuit or processor of board 39 to process the signal from the signal source 38. As such, the computer system 31 is a general purpose computer system that becomes a specific purpose computer system when executing the routine 37 of the present invention.

The computer system 31 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of volume rendering two digital image datasets comprising the steps of:

providing at least a first digitized image volume and a second digitized image volume, each image volume comprising a plurality of intensities corresponding to a domain of points on a 3-dimensional grid;

providing a volume-rendering computing sub-system, said sub-system adapted to function as part of a personal computer workstation, said system comprising memory for storing said 3-dimensional image volumes, an image buffer for storing 2-dimensional renderings of said 3-dimensional images, and a depth buffer for storing depth values for said 2-dimensional renderings;

loading a first image volume into a memory of said volume-rendering sub-system;

rendering said first image volume, wherein a 2-dimensional image is output into an image buffer and a set of depth values are output into a depth buffer;

loading a second image volume into a memory of said volume-rendering sub-system;

rendering said second image volume up to the depth values output from the rendering of said first image volume, wherein values from said rendering of said second image volume are merged with non-zero values of said image buffer; and rendering the remainder of said second image volume to include second image volume points beyond the depth values output from the rendering of said first image volume, wherein values from said rendering of said remainder of said second image volume are merged with non-zero values of said image buffer.

2. The method of claim 1, further comprising displaying the result of said rendering on a computer display monitor.

3. The method of claim 1, wherein rendering an image volume comprises casting a plurality of rays from an image plane into said image volume, selecting sample points from said image volume along each said ray, assigning color and opacity values to each sample point along each ray, and accumulating color and opacity values from each successive sample point along each ray.

4. The method of claim 3, wherein said volume-rendering computing sub-system includes look-up-tables (LUT) for classifying image intensity values, and further comprising initializing a first LUT associated with said first image volume, initializing a second LUT associated with said second image volume, wherein said LUT assigns a color or opacity value to a sample based on the image volume intensity value associated with said sample.

5. The method of claim 1, wherein said volume-rendering computing sub-system includes functions for testing and updating depth values, and further comprising selecting functions for testing and updating depth values of said first image volume, and selecting functions for testing and updating depth values of said second image volume.

6. The method of claim 3, wherein said volume-rendering computing sub-system includes functions for filtering and accumulating image intensity values, and further comprising selecting functions for accumulating said first image volume intensity values and for accumulating said second image volume intensity values.

7. The method of claim 5, wherein said functions for testing and updating depth values include one or more of testing the direction of a gradient of said image volume intensity, testing whether or not the magnitude of said gradient lies within a certain range, testing whether or not a value of a sample lies within a predetermined range, and testing whether or not an accumulated value of a ray lies within a predetermined range.

8. The method of claim 6, wherein said functions for accumulating said image volume intensity values include Front-to-Back, Back-to-Front, Minimum, Maximum, Replace, and Sum-and-Count.

9. The method of claim 1, wherein said method is implemented in a program of instructions executable by a computer, said program of instructions tangibly embodied in a program storage device readable by a computer.

10. A method of volume rendering two digital image datasets comprising the steps of:
providing at least a first digitized image volume and a second digitized image volume, each image volume comprising a plurality of intensities corresponding to a domain of points on a 3-dimensional grid;
providing a volume-rendering computing sub-system, said sub-system adapted to function as part of a personal computer workstation, said system comprising memory for storing said 3-dimensional image volumes, and functions for filtering image volume intensity values and functions for blending image volume intensity values;
reading said first and second image volumes into the memory of said volume-rendering computing sub-system;
filtering said first image volume with a filtering function;
filtering said second image volume with a filtering function;
merging said first and second image volumes using a blending function; and
rendering said merged image volume.

11. The method of claim 10, further comprising providing a fusion factor to said volume-rendering computing sub-system.

12. The method of claim 10, further comprising selecting one of said two image volumes as a low resolution dataset, and selecting the other of said two image volumes as a high resolution dataset.

13. The method of claim 12, further comprising converting said high resolution dataset and said low resolution dataset wherein more bits are used to represent the higher resolution data set than are used to represent the lower resolution data set.

14. The method of claim 13, wherein said high resolution dataset is represented by 12-bit words, and said low resolution dataset is represented by 8-bit words.

15. The method of claim 11, wherein said volume-rendering computing sub-system includes look-up-tables (LUT) for classifying image intensity values, and further comprising using said fusion factor to use an 8-bit LUT with said low resolution dataset and to use a 12-bit LUT with said high resolution dataset.

16. The method of claim 10, wherein said filtering functions include functions for testing that an opacity of a sample is within a predetermined range, testing that an accumulated opacity is within a predetermined range, testing whether a gradient magnitude is within a predetermined range, and testing whether a gradient direction is within a predetermined direction.

17. The method of claim 10, wherein each of said intensities comprises a vector of red, green, blue, and opacity values.

18. A method of volume rendering a plurality of digital image datasets comprising the steps of:
providing a plurality of digitized image volumes, each image volume comprising a plurality of intensities corresponding to a domain of points on a 3-dimensional grid;
providing a volume-rendering computing sub-system;
dividing each of said plurality of image volumes into a plurality of slabs, each slab defined by a range of depths within each said image volume;
for each of said plurality of image volumes, loading said images volumes into memory of said volume-rendering computing sub-system, rendering said first slab of each image volume using said volume-rendering computing sub-system, and merging the rendering of each first image volume slab into a first 2-dimensional image, rendering each subsequent slab of each image volume using said volume-rendering computing sub-system, merging the rendering of each subsequent slab into a subsequent 2-dimensional image, and merging each subsequent 2-dimensional image with said first 2-dimensional image.

* * * * *